United States Patent
Johansson (10) Patent No.: US 9,450,397 B2
(45) Date of Patent: Sep. 20, 2016

(54) CIRCUIT BREAKING ARRANGEMENT

(71) Applicant: ABB Technology Ltd, Zürich (CH)

(72) Inventor: Kenneth Johansson, Täby (SE)

(73) Assignee: ABB TECHNOLOGY Ltd, Zurich (CH)

( * ) Notice: Subject to any disclaimer, the term of this patent is extended or adjusted under 35 U.S.C. 154(b) by 0 days.

(21) Appl. No.: 14/781,452

(22) PCT Filed: Apr. 9, 2013

(86) PCT No.: PCT/EP2013/057408
§ 371 (c)(1),
(2) Date: Sep. 30, 2015

(87) PCT Pub. No.: WO2014/166528
PCT Pub. Date: Oct. 16, 2014

(65) Prior Publication Data
US 2016/0028222 A1 Jan. 28, 2016

(51) Int. Cl.
| | |
|---|---|
| *H02H 3/20* | (2006.01) |
| *H01H 9/56* | (2006.01) |
| *H01H 33/59* | (2006.01) |
| *H02H 3/02* | (2006.01) |
| *H02H 3/087* | (2006.01) |
| *H01H 9/54* | (2006.01) |

(52) U.S. Cl.
CPC .............. *H02H 3/202* (2013.01); *H01H 9/541* (2013.01); *H01H 9/56* (2013.01); *H01H 33/596* (2013.01); *H02H 3/021* (2013.01); *H02H 3/087* (2013.01)

(58) Field of Classification Search
CPC ........ H02H 3/20; H02H 3/202; H02H 3/021; H02H 3/087; H01H 9/56; H01H 33/596; H01H 9/541
See application file for complete search history.

(56) References Cited

U.S. PATENT DOCUMENTS

| | | | |
|---|---|---|---|
| 3,753,042 A | 8/1973 | Kind et al. | |
| 4,618,905 A * | 10/1986 | Tokuyama | H01H 33/596 361/13 |
| 4,805,062 A * | 2/1989 | Shirouzu | H01H 33/596 361/13 |
| 5,668,691 A * | 9/1997 | Ito | H01H 33/596 361/113 |
| 5,793,586 A | 8/1998 | Rockot et al. | |
| 2006/0132269 A1* | 6/2006 | Kadah | H01H 9/56 335/128 |

FOREIGN PATENT DOCUMENTS

| | | |
|---|---|---|
| DE | 2 038 624 | 2/1972 |
| EP | 0 108 279 A1 | 5/1984 |

* cited by examiner

*Primary Examiner* — Zeev V Kitov
(74) *Attorney, Agent, or Firm* — Birch, Stewart, Kolasch & Birch, LLP (57) ABSTRACT

A circuit breaking arrangement is disclosed, which is adapted to be coupled to a transmission line arranged to carry direct current for controllably effecting discontinuation of flow of direct current in the transmission line. The circuit breaking arrangement includes a current interrupter unit, which is adapted to, when actuated, interrupt current in the transmission line, and at least one resonance circuit. The resonance circuit is connected in parallel with the current interrupter unit and includes at least one capacitor, at least one inductor and at least one switch element. The resonance circuit is adapted to, upon actuation of the current interrupter unit, generate a resonance current superposing current of any arc generated in the current interrupter unit after actuation thereof, upon closing of the switch element by means of successive discharging and charging of the at least one capacitor. An auxiliary power supply unit is coupled to the resonance circuit and adapted to selectively and controllably convey power to the at least one capacitor, thereby charging it. On a condition that voltage of the transmission line and/or voltage of the at least one capacitor does not comply with a selected voltage criterion, the auxiliary power supply unit is caused to convey power to the at least one capacitor. The circuit breaking arrangement may be arranged so as to allow for conveyance of power transmitted in the transmission line to the at least one capacitor, thereby charging it.

20 Claims, 7 Drawing Sheets

CIRCUIT BREAKING ARRANGEMENT

FIELD OF THE INVENTION

The present invention generally relates to power systems e.g. for transmission of power. Specifically, the present invention relates to a circuit breaking arrangement for use e.g. in a power system.

BACKGROUND OF THE INVENTION

Power systems such as electrical power distribution or transmission systems generally include a protection system for protecting, monitoring and controlling the operation and/or functionality of other components included in the power system. Such protection systems may for example be able to detect short circuits, overcurrents and overvoltages in power lines, transformers and/or other parts or components of the power system. The protection systems can include protection equipment such as circuit breakers for isolating any possible faults for example occurring in power transmission and distribution lines by opening or tripping the circuit breakers. After the fault has been cleared, e.g. by performing repairs and/or maintenance on the component in which the fault has been detected, the power flow can be restored by closing the circuit breakers. In alternative or in addition, the protection systems can be arranged to, upon detection of a fault in a particular route for power flow, isolate the route in which the fault has been detected and select an alternative route for the power flow.

Operation of the circuit breakers may be responsive to detection of a fault condition or fault current. Upon detection of a fault condition or fault current, a mechanism may operate the circuit breaker so as to interrupt the current flowing there through. Once a fault has been detected, contacts within the circuit breaker may separate in order to interrupt the current there through. Spring arrangements, pneumatic arrangements or some other means utilizing mechanically stored energy may be employed to separate the contacts. Hence, mechanical current interrupters may for example be employed in circuit breakers. In alternative or in addition, solid-state interrupters based on semiconductor devices may be employed in the circuit breakers. When interrupting the current flowing in the electrical circuit, an arc is in general generated. Such an arc may be referred to as a fault current arc. In order to break the current in the electrical circuit, it may be required or desired to extinguish such an arc. Once the fault condition has been mitigated or eliminated the contacts can be closed so as to resume flow of current through the circuit breaker.

High Voltage Direct Current (HVDC) power transmission is becoming increasingly important due to the increasing need for power supply or delivery and interconnected power transmission and distribution systems. An HVDC grid or a DC grid may comprise multiple alternating current (AC)/DC converter terminals interconnected by transmission lines, e.g., underground cables and/or overhead lines. Within the grid, a terminal may be connected to multiple terminals resulting in different types of topologies. DC circuit breakers can be used for isolating faulty components, such as transmission lines, in power systems such as HVDC and DC grids. Unlike AC circuit breakers, there are no natural current zeros at which a fault current arc may be extinguished in DC circuit breakers. Instead, it may be desired or even required to create one or more current zeros when utilizing DC circuit breakers.

One example of a way to create current zeros in order to extinguish a fault current arc in a current interrupter in a DC circuit breaker is to employ a so called resonance circuit connected in parallel with the current interrupter. The resonance circuit may in alternative be referred to as an oscillation circuit or an injection circuit. The resonance circuit can be operated such that an oscillation starts, wherein a high frequency current, or resonance current or injection current, created in the resonance circuit superposes the fault current and generates one or more current zeros, at which the fault current arc can be extinguished. The resonance circuit may for example comprise an inductor, a capacitor and possibly a switch element connected in series. During normal operation, i.e. when no fault has been detected or no fault current has been sensed, the current interrupter is closed and the switch element in the resonance circuit is open. Upon reception of a trip signal, which e.g. may be issued by an external control unit or a protective unit of an HVDC power transmission system in which DC circuit breaker is included, the current interrupter is opened by separating contacts therein to interrupt the direct current through the DC circuit breaker. Upon interrupting or breaking the direct current, a current is carried between the contacts of the current interrupter through an arc. Thus, a fault current arc is created between the contacts in the current interrupter. It is generally desired or even required to extinguish the fault current arc in order to break the current through the DC circuit breaker. A short time after the current interrupter has been opened, typically after about one or a few milliseconds, depending e.g. on how much the contacts have been separated, the switch element in the resonance circuit is closed. In order to start the oscillation after the current interrupter has been opened (and the switch element has been closed), the capacitor in the resonance circuit normally needs to be charged. The capacitor, being charged with a certain polarity, discharges via one of its ends or capacitor plates through the inductor in the resonance circuit. As the capacitor discharges, the inductor will create a magnetic field. Then, once the capacitor has been discharged, the inductor will charge the capacitor. Once the magnetic field of the inductor collapses, the capacitor has been recharged (but with the opposite polarity), and so it may discharge again through the inductor. The thus created resonance current can be made to superpose the fault current and generate one or more current zeros, at which the fault current arc can be extinguished. In alternative or in addition to charging the capacitor with a voltage to start the oscillation, a magnetic field may be created in the inductor by means of a current or a magnetic pulse. Hence, by creating a magnetic field in the inductor, the resonance circuit may be activated in order to start an oscillation that creates a resonance current.

However, there is still a need in the art for improved DC circuit breaking arrangements which can provide an improved performance with respect to operation compared to known DC circuit breaking arrangements.

EP 0 108 279 A1 discloses a high-voltage DC circuit breaker apparatus with reverse current insertion system by line voltage charge, which comprises a commutation switch, a series circuit of a capacitor, a reactor and a switch connected in parallel with the commutation switch, and a resistor (R) connected so us to charge the capacitor by a line voltage.

DE 20 38 624 A1 discloses a method and apparatus for breaking direct and alternating currents at high voltages. In parallel with a commutation switch is a series circuit of a capacitor, a reactor and a switch, as well as a resistor.

SUMMARY OF THE INVENTION

For example in power systems having relatively high operating voltages, such as HVDC grids, in case a fault occurs or is present in the DC line, the capacitor of a DC circuit breaker may be required to be charged to a relatively high potential in order to be able to disconnect the DC line by means of extinguishing a fault current arc carried between contacts of a current interrupter in the DC circuit breaker. The DC line voltage can be used to charge the capacitor. However, in some cases the DC line voltage may be insufficient to sufficiently charge the capacitor (e.g. to a high enough potential), for example in case the DC line has been disconnected from at least a portion of the rest of the power system (for a certain period), and/or in case there has been maintenance performed on the DC line. In both cases, after the DC circuit breaker has successfully disconnected the DC line, there is a possibility that the fault still persists after the current interrupter in the DC circuit breaker has been closed. In that case, quick operation (tripping) of the DC circuit breaker in order to isolate the (still) faulty DC line from at least a portion of the rest of the power system again may be generally desired or even required.

In view of the above discussion, a concern of the present invention is to provide a circuit breaking arrangement capable of interrupting direct current, which circuit breaking arrangement provides an improved performance with respect to operation compared to known DC circuit breaking arrangements.

A further concern of the present invention is to provide a circuit breaking arrangement capable of interrupting direct current in power systems having relatively high operating voltages, which circuit breaking arrangement provides an improved performance with respect to operation compared to known DC circuit breaking arrangements.

A further concern of the present invention is to provide or achieve a circuit breaking arrangement capable of interrupting direct current, which circuit breaking arrangement facilitates or even enables a capability to relatively quickly interrupt the current in a DC line by operating the current interrupter again after having closed it, in case a fault still persists in the DC line.

To address at least one of these concerns and other concerns, a circuit breaking arrangement, a method and a computer program product in accordance with the independent claims are provided. Preferred embodiments are defined by the dependent claims.

According to a first aspect of the present invention, there is provided a circuit breaking arrangement which is adapted to be coupled to a transmission line arranged to carry direct current for controllably effecting discontinuation of flow of direct current in the transmission line. The circuit breaking arrangement comprises a current interrupter unit which is adapted to, when actuated, interrupt current in the transmission line. The circuit breaking arrangement comprises at least one resonance circuit, which is connected in parallel with the current interrupter unit. The resonance circuit includes at least one capacitor, at least one inductor and at least one switch element. The resonance circuit is adapted to, upon actuation of the current interrupter unit, generate a resonance current superposing current of any arc generated in the current interrupter unit after actuation thereof, upon closing of the switch element by means of successive discharging and charging of the at least one capacitor. The circuit breaking arrangement comprises an auxiliary power supply unit coupled to the resonance circuit and adapted to selectively and controllably convey power to the at least one capacitor of the resonance circuit, thereby charging said at least one capacitor. The circuit breaking arrangement comprises a sensing unit, adapted to determine voltage of the transmission line and/or voltage of the at least one capacitor, and a control unit, which is coupled to the sensing unit and to the auxiliary power supply unit. The control unit is adapted to, on a condition that the determined voltage does not comply with a selected voltage criterion, cause the auxiliary power supply unit to convey power to the at least one capacitor of the resonance circuit.

Hence, on a condition that the determined voltage does not comply with a selected voltage criterion, the capacitor of the resonance circuit may be charged by means of the auxiliary power supply unit, which may be arranged on ground level or at ground potential. The auxiliary power supply unit and the selective and controllable conveying of power therefrom to the at least one capacitor of the resonance circuit may allow for using voltage supplied by the auxiliary power supply unit e.g. in case the DC line voltage is insufficient to sufficiently charge the at least one capacitor of the resonance circuit (e.g. to a sufficiently high potential). Thereby, for example in power systems having relatively high operating voltages, such as HVDC grids, where the at least one capacitor may be required to be charged to a relatively high potential in order to be able to disconnect the DC line (transmission line) by means of extinguishing a fault current arc carried between contacts of the current interrupter, fast operation of the circuit breaking arrangement in case a fault occurs or is present in the transmission line, even when the DC line voltage is insufficient to sufficiently charge the at least one capacitor of the resonance circuit, may be possible.

The selected voltage criterion may for example include the determined voltage exceeding a predefined voltage level.

The resonance circuit may be coupled to ground, e.g. via the auxiliary power supply, such that at least some of any power transmitted in the transmission line can at least momentarily charge the at least one capacitor.

For example, the auxiliary power supply unit may be arranged so as to at least momentarily, e.g. when the auxiliary power supply unit is inactive and not supplying power, allow for direct current to flow between the transmission line and ground via the resonance circuit and the auxiliary power supply unit.

The auxiliary power supply unit may for example include a direct current power supply. The auxiliary power supply unit may for example comprise a diode and a transformer connected in series. The transformer may be connected to ground.

According to another example, the auxiliary power supply unit may include at least two diodes connected in series and a transformer connected between the two diodes via a capacitor. The transformer and the capacitor may be connected in series. The transformer and/or at least one of the diodes may be connected to ground.

Hence, the charging of the at least one capacitor may utilize the transmission line voltage (or power transmitted in the transmission line), in case it is sufficient to sufficiently charge the at least one capacitor, and voltage supplied by the auxiliary power supply unit in case the transmission line voltage is insufficient to sufficiently charge the at least one capacitor. This may be enabled or facilitated by means of the auxiliary power supply unit, and the selective control of conveyance of power therefrom to the at least one capacitor of the resonance circuit, at least during a predefined or selected period of time. Thereby, in case the transmission line voltage is insufficient to sufficiently charge the at least one capacitor, e.g. in case the transmission line has been disconnected from at least a portion of the rest of the power system (e.g. for a certain period), and/or in case there has been maintenance performed on the transmission line, the at least one capacitor of the resonance circuit can be charged by means of the auxiliary power supply unit. Preferably, by means of the auxiliary power supply unit the at least one capacitor can be kept in a (fully) charged state in principle continually, e.g. when the transmission line is in operation (except for e.g. during when the resonance circuit generates a resonance current, by means of successive discharging and charging of the at least one capacitor), and be ready for operation (activation of the resonance circuit).

According to one example, the charging of the at least one capacitor may utilize both the transmission line voltage (or power transmitted in the transmission line) and voltage supplied by the auxiliary power supply unit.

According to another example, there may be a disconnector on the transmission line arranged in series with the current interrupter unit. Such a disconnector may be arranged on the transmission line at one or both sides of the current interrupter unit. The disconnector is normally opened shortly after (e.g. a few milliseconds) the current interrupter has interrupted the current in the transmission line, or shortly after (e.g. a few milliseconds) the flow of direct current in the transmission line has been discontinued. The disconnector may in some cases be arranged relatively to the at least one capacitor in the resonance circuit, or vice versa, such that when the disconnector is in an open state the transmission line voltage possibly is insufficient to sufficiently charge the at least one capacitor. In such a case, the at least one capacitor of the resonance circuit can be charged by means of the auxiliary power supply unit.

The circuit breaking arrangement may comprise a circuit path which is coupled to the resonance circuit in such a way that the auxiliary power supply unit, at least a part of the resonance circuit and the circuit path at least partially define a charging circuit path, which charging circuit path may be arranged so as to permit charging of the at least one capacitor in the resonance circuit by means of power supplied by the auxiliary power supply unit. The circuit path included in the charging circuit path may for example comprise a resistor and a diode connected in series, possibly with the diode connected to ground. Thereby, charging of the at least one capacitor in the resonance circuit by means of the auxiliary power supply unit may be facilitated or even enabled for example in case the impedance of the transmission line is relatively high, such that the transmission line may be unsuitable or undesired to use for conveying a charging current for charging of the at least one capacitor. In case such functionality is desired or required, the resistor may have a relatively high resistance value. After the current interrupter unit has been actuated so as to interrupt current in the transmission line, thereby creating a fault current arc between the contacts in the current interrupter unit, the resistor and the diode may act as voltage limitation means which may reduce or limit the voltage over the current interrupter unit when direct current is flowing through the current interrupter unit, which in turn may enable or facilitate for the current interrupter unit to have a reduced capacity to withstand relatively high voltages. In case such a voltage limitation function is desired or required, the resistor may have a relatively low resistance value.

According to a second aspect of the present invention, there is provided a power system including a transmission line arranged to carry direct current and a circuit breaking arrangement according to the first aspect of the present invention. The circuit breaking arrangement is coupled to the transmission line for controllably effecting discontinuation of flow of direct current in the transmission line.

The power system may for example comprise an HVDC power transmission system.

According to a third aspect of the present invention, there is provided a method implemented in a circuit breaking arrangement, which is adapted to be coupled to a transmission line arranged to carry direct current, for controllably effecting discontinuation of flow of direct current in the transmission line. The circuit breaking arrangement comprises a current interrupter unit adapted to, when actuated, interrupt current in the transmission line, and at least one resonance circuit connected in parallel with the current interrupter unit. The resonance circuit includes at least one capacitor, at least one inductor and a switch element. The resonance circuit is adapted to, upon actuation of the current interrupter unit, generate a resonance current superposing current of any arc generated in the current interrupter unit after actuation thereof, upon closing of the switch element by means of successive discharging and charging of the at least one capacitor. The circuit breaking arrangement comprises an auxiliary power supply unit coupled to the resonance circuit. The auxiliary power supply unit is adapted to selectively and controllably convey power to the at least one capacitor of the resonance circuit, thereby charging the at least one capacitor of the resonance circuit. Voltage of the transmission line and/or voltage of the at least one capacitor is determined, or sensed. On a condition that the determined voltage does not comply with a selected voltage criterion, the auxiliary power supply unit is caused to convey power to the at least one capacitor of the resonance circuit.

According to a fourth aspect of the present invention, there is provided a computer program product adapted to be executed in a control unit of a circuit breaking arrangement. The circuit breaking arrangement is adapted to be coupled to a transmission line arranged to carry direct current for controllably effecting discontinuation of flow of direct current in the transmission line. The circuit breaking arrangement comprises a current interrupter unit adapted to, when actuated, interrupt current in the transmission line. The circuit breaking arrangement comprises at least one resonance circuit connected in parallel with the current interrupter unit. The resonance circuit includes at least one capacitor, at least one inductor and at least one switch element. The resonance circuit is adapted to, upon actuation of the current interrupter unit, generate a resonance current superposing current of any arc generated in the current interrupter unit after actuation thereof, upon closing of the switch element by means of successive discharging and charging of the at least one capacitor. The circuit breaking arrangement comprises an auxiliary power supply unit coupled to the resonance circuit. The auxiliary power supply unit is adapted to selectively and controllably convey power to the at least one capacitor of the resonance circuit, thereby charging the at least one capacitor of the resonance circuit. The circuit breaking arrangement comprises a sensing unit adapted to determine, or sense, voltage of the transmission line and/or voltage of the at least one capacitor. The control unit is coupled to the sensing unit and to the auxiliary power supply unit, e.g. for controlling operation of the sensing unit and the auxiliary power supply unit, respectively.

The computer program product comprises computer-readable means carrying computer program code, which is configured to, when executed in the control unit of the circuit breaking arrangement, cause the sensing unit to determine voltage of the transmission line and/or voltage of the at least one capacitor. The computer program code is configured to, when executed in the control unit of the circuit breaking arrangement, on a condition that the determined voltage does not comply with a selected voltage criterion, cause the auxiliary power supply unit to convey power to the at least one capacitor of the resonance circuit.

Further objects and advantages of the present invention are described in the following by means of exemplifying embodiments.

It is noted that the present invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

Exemplifying embodiments of the invention will be described below with reference to the other accompanying drawings.

In the accompanying drawings, the same reference numerals denote the same or similar elements throughout the views.

DETAILED DESCRIPTION

The present invention will now be described more fully hereinafter with reference to the accompanying drawings, in which exemplifying embodiments of the present invention are shown. The present invention may, however, be embodied in many different forms and should not be construed as limited to the embodiments set forth herein; rather, these embodiments are provided by way of example so that this disclosure will convey the scope of the invention to those skilled in the art. The steps of any method disclosed herein do not have to be performed in the exact order as disclosed, unless explicitly stated so. Furthermore, like numbers refer to the same or similar elements or components throughout.

Figure 1:
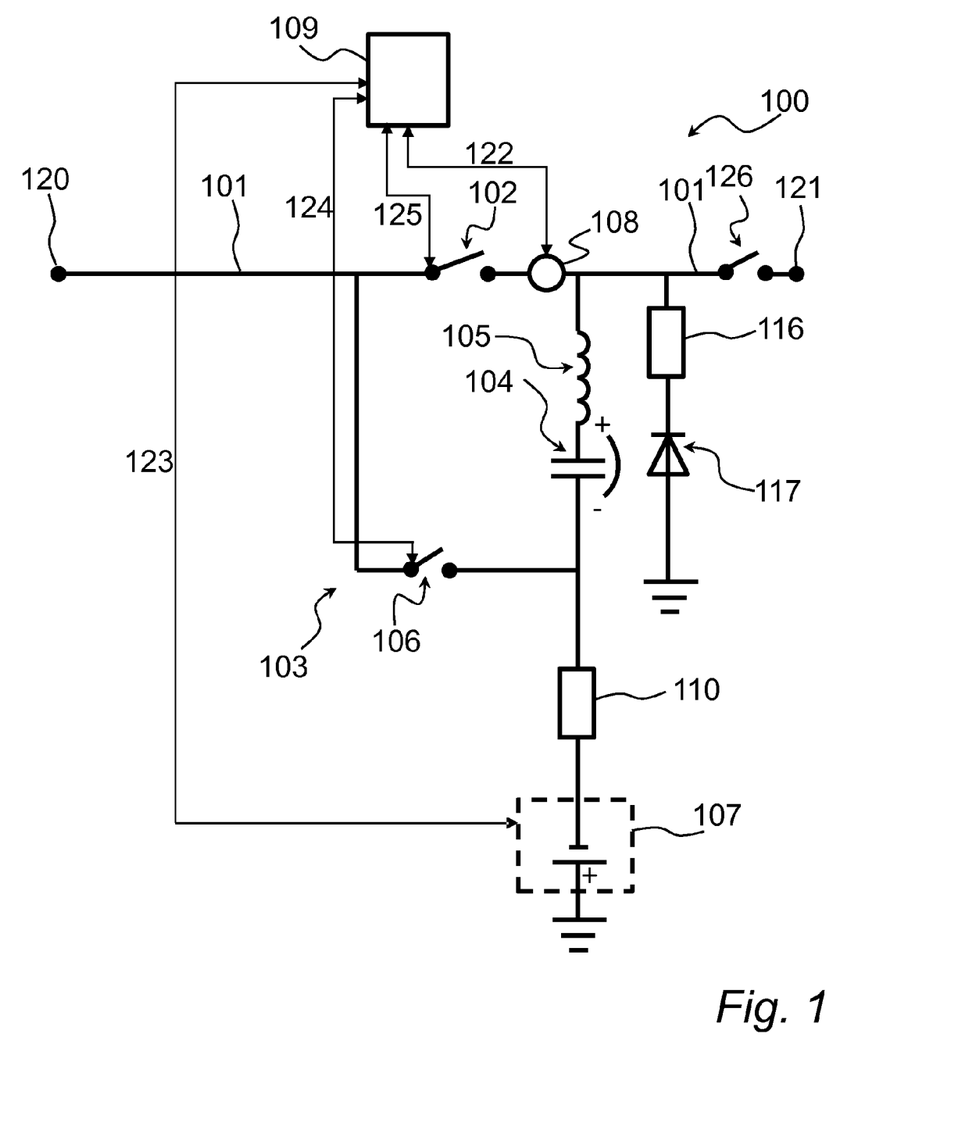
FIGS. 1-5 are schematic views of circuit breaking arrangements according to embodiments of the present invention.

Referring now to FIG. 1, there is shown a schematic view of a circuit breaking arrangement 100 according to an embodiment of the present invention. The circuit breaking arrangement 100 is adapted to be coupled to a transmission line 101, arranged to carry direct current, for controllably effecting discontinuation of flow of direct current in the transmission line 101.

In FIG. 1, a portion of transmission line 101 is shown, which portion of transmission line 101 is arranged to carry direct current between terminals 120 and 121. It is to be understood that the transmission line 101 may be included in a power system (not shown in FIG. 1), e.g. a power transmission system such as an HVDC power transmission system or an HVDC grid or a DC grid.

The transmission line 101 may for example be a power transmission line such as a DC cable, an overhead line (OHL) or a combination of DC cable and OHL. According to an example, the circuit breaking arrangement 100 may be connected via the transmission line 101 directly or substantially directly to a converter station, e.g. a HVDC converter station in case the transmission line 101 is included in a HVDC power transmission system or an HVDC grid.

The circuit breaking arrangement 100 comprises a current interrupter unit 102, which for example may include or be constituted by a mechanical interrupter and/or a solid-state interrupter based on semiconductor devices.

The current interrupter unit 102 can be actuated, preferably selectively and/or controllably, and is adapted to, when actuated, interrupt current in the transmission line 101.

When the current interrupter 102 is actuated so as to interrupt or break the direct current in the transmission line 101, a current is carried between the contacts (not shown in FIG. 1) of the current interrupter unit 102 through an arc. The current carried between the contacts of the current interrupter unit 102 through an arc may be referred to as a fault current arc, which hence is created between the contacts in the current interrupter unit 102.

The circuit breaking arrangement 100 comprises a resonance circuit 103 connected in parallel with the current interrupter unit 102. According to the embodiment depicted in FIG. 1, the resonance circuit 103 includes a capacitor 104, an inductor 105 and a switch element 106 connected in series.

The switch element 106 may for example comprise a mechanical and/or solid state based (e.g. semiconductor based) switch, a spark gap, etc.

The resonance circuit 103 is adapted to, upon actuation of the current interrupter unit 102, generate a resonance current superposing current of any arc generated in the current interrupter unit 102 after actuation thereof, e.g. after the current interrupter unit 102 has been operated so as to interrupt or break direct current in the transmission line 101, upon closing of the switch element 106 by means of successive discharging and charging of the capacitor 104.

During operation of the circuit breaking arrangement 100, a relatively short time after the current interrupter unit 102 has been actuated or opened, typically after about one or a few milliseconds, depending e.g. on how much the contacts of the current interrupter unit 102 have been separated, the switch element 106 in the resonance circuit 103 may be closed.

In order to illustrate principles of embodiments of the present invention, the following example may be considered. In order to activate the resonance circuit 103 to start an oscillation that creates the resonance current, the capacitor 104 is first charged. The charging of the capacitor will be further described below. The switch element 106, which during normal operation of the transmission line 101 is open, is closed for starting the oscillation. The capacitor 104, being charged with a certain polarity, discharges via one of its ends or capacitor plates through the inductor 105. The resulting current then travels between the contacts of the current interrupter unit 102 through the fault current arc, and subsequently returns to the capacitor 104 via the (closed) switch element 106. As the capacitor 104 discharges, the inductor 105 will create a magnetic field. Then, once the capacitor 104 has been discharged, the inductor 105 will charge the capacitor 104. Once the magnetic field of the inductor 105 collapses, the capacitor 104 has been recharged, but with the opposite polarity compared to the previous charging, and so the capacitor 108 may discharge again through the inductor 105. The thus created resonance current, which hence travels between the contacts of the current interrupter unit 102 through the fault current arc and passes through the switch element 106, the capacitor 104, and the inductor 105, can be made to superpose the fault current and generate one or more current zeros, at which the fault current arc can be extinguished.

The circuit breaking arrangement 100 comprises an auxiliary power supply unit 107 which is coupled to the resonance circuit 103, e.g. via a resistor 110 as illustrated in FIG. 1. The auxiliary power supply unit 107 is adapted to selectively and controllably convey power to the capacitor 104 of the resonance circuit 103, whereby the capacitor 104 is charged. Thereby, by means of the auxiliary power supply unit 107 the capacitor 104 can be charged so as to allow for activation of the resonance circuit 103 in order to start an oscillation that creates a resonance current, as described above.

As indicated in FIG. 1, the auxiliary power supply unit 107 may for example include or be constituted by a direct current power supply, preferably a high voltage direct current power supply. The auxiliary power supply unit 107 is connected to ground. Other examples of the auxiliary power supply unit 107 are described in the following with reference to FIGS. 2 and 3. The auxiliary power supply unit 107 may be adapted to itself generate power, and/or to convey power generated by some other power source.

The circuit breaking arrangement 100 comprises a sensing unit adapted to determine voltage of the transmission line 101, e.g. at least one voltage, possibly between the transmission line 101 and ground. For example when, in according with the embodiment depicted in FIG. 1, the capacitor 104 is connected to the terminal 121, the sensing unit can be adapted to determine voltage of the portion of the transmission line 101 which extends between the current interrupter unit 102 and the terminal 121, or between the current interrupter unit 102 and the disconnector 126 (the disconnector 126 being described further below), e.g. a voltage between the said portion of the transmission line 101 and ground. In alternative or in addition, the sensing unit can be adapted to determine voltage of the capacitor 104, or voltage over the capacitor 104, e.g. a charging voltage of the capacitor 104. For example, the sensing unit may comprise a voltage sensing unit adapted to sense voltage of the above-mentioned portion of the transmission line 101 and/or voltage of the capacitor 104. An example where the sensing unit comprises a voltage sensing unit adapted to sense voltage of the above-mentioned portion of the transmission line 101 and/or voltage of the capacitor 104 is mainly referred to in the following description, but the present invention is not limited to this example. For example, the sensing unit may be arranged so as to indirectly be able to determine voltage of the above-mentioned portion of the transmission line 101 and/or voltage of the capacitor 104, e.g. by deducing or estimating voltage of the above-mentioned portion of the transmission line 101 and/or voltage of the capacitor 104 by means of sensing or determining some other voltage related parameter of the above-mentioned portion of the transmission line 101 and/or the capacitor 104, and not necessarily by directly sensing voltage of the above-mentioned portion of the transmission line 101 and/or voltage of the capacitor 104. The sensing unit, or voltage sensing unit, is indicated schematically by element 108 in FIG. 1.

The circuit breaking arrangement 100 comprises a control unit 109. The control unit 109 is coupled to the voltage sensing unit 108 and to the auxiliary power supply unit 107.

The control unit 109 is adapted to, on a condition that voltage sensed by the voltage sensing unit 108 does not comply with a selected voltage criterion, cause the auxiliary power supply unit 107 to convey power to the capacitor 104 of the resonance circuit 103, e.g. during a predefined or selected period of time, and/or until the sensed voltage complies with the selected voltage criterion.

The selected voltage criterion, which may be predefined, may for example include or be constituted by the sensed or determined voltage exceeding a predefined voltage level. The predefined voltage level may for example be based on an estimated voltage level in the transmission line 101 that is expected to be sufficiently high so as to enable charging the capacitor 104 to a relatively high potential in order to be able to disconnect the transmission line 101 by means of extinguishing a fault current arc carried between contacts of the current interrupter 102. In alternative or in addition, the selected voltage criterion may include a voltage over the capacitor 104, e.g. a charging voltage, exceeding a predefined voltage level needed or desired in order for the resonance circuit 103 to be able to generate a resonance current, initiated by discharging of the capacitor 104, which resonance current is capable of disconnecting the transmission line 101 by means of extinguishing a fault current arc carried between contacts of the current interrupter 102.

In accordance with the embodiment depicted in FIG. 1, the capacitor 104 can be charged by means of any power transmitted in the transmission line 101 by the resonance circuit 103 being coupled to ground via the auxiliary power supply 107. Thereby, in case the DC line (transmission line 101) voltage is sufficiently high to sufficiently charge the capacitor 104 (e.g. to a high enough potential), the capacitor 104 can be charged by means of any (or at least some of the) power transmitted in the transmission line 101 so as to allow for activation of the resonance circuit 103 in order to start an oscillation that creates a resonance current, as described above.

Hence, in accordance with the embodiment of the present invention depicted in FIG. 1, the charging of a DC circuit breaker capacitor may use the DC line voltage if it is sufficient to charge the capacitor, and use voltage supplied by an auxiliary power supply, which e.g. may include a transformer, on ground level if the DC line voltage is insufficient to charge the capacitor. According to the embodiment of the present invention depicted in FIG. 1, this is enabled or facilitated by means of the auxiliary power supply unit 107 and the selective control of conveyance of power therefrom to the capacitor 104 of the resonance circuit 103, at least during a predefined or selected period of time. Thereby, in case transmission line 101 voltage is insufficient to charge the capacitor 104, e.g. in case the transmission line 101 has been disconnected from at least a portion of the rest of the power system (for a certain period), and/or in case there has been maintenance performed on the DC line, the capacitor 104 can be charged by means of the auxiliary power supply unit 107.

According to the embodiment illustrated in FIG. 1, the circuit breaking arrangement 100 may comprise a disconnector, or disconnecting switch, 126 on the transmission line 101 arranged in series with the current interrupter unit 102. The disconnector 126 is optional. In alternative or in addition, a disconnector 126 may be arranged on the other side of the current interrupter unit 102 as compared to the arrangement of the disconnector 126 in FIG. 1. The disconnector 126 is normally opened shortly after (e.g. a few milliseconds) the current interrupter 102 has interrupted the current in the transmission line 101, or shortly after (e.g. a few milliseconds) the flow of direct current in the transmission line 101 has been discontinued. By opening the disconnector 126 the circuit breaking arrangement 100 can be disconnected or isolated from the terminal 121. In case the disconnector 126 has been opened, the transmission line 101 voltage may be insufficient to sufficiently charge the capacitor 104. In such a case however, the capacitor 104 can be charged by means of the auxiliary power supply unit 107.

The charging of the capacitor 104 may be such that the capacitors' 104 charged side voltage is at or substantially at ground potential, or at a voltage that is lower than the ground potential, or at any voltage between the DC line (transmission line 101) voltage and the ground potential (or lower).

The circuit breaking arrangement 100 may include more than one resonance circuit. In case of more than one resonance circuit being included in the circuit breaking arrangement 100, one or more additional resonance circuits, each possibly including a capacitor, an inductor and a switch element connected in series such as in resonance circuit 103, may be connected in parallel with the current interrupter unit 102 and/or the resonance circuit 103.

In accordance with the embodiment depicted in FIG. 1, the circuit breaking arrangement 100 comprises a control unit 109, which, as indicated in FIG. 1 by reference numerals 122, 123, 124 and 125, respectively, may be coupled to the voltage sensing unit 108, the auxiliary power supply unit 107, the resonance circuit 103 (e.g. to the switch element 106 in the resonance circuit 103 as depicted in FIG. 1) and the current interrupter unit 102, respectively, as illustrated in FIG. 1. Thereby, the control unit 109 may be capable of operating the voltage sensing unit 108, the auxiliary power supply unit 107, and the current interrupter unit 102, and of activation and deactivation of the resonance circuit 103, e.g. by opening and closing of the switch element 106.

The control, and/or processing, unit 109 of the circuit breaking arrangement 100 may include or be constituted for example by any suitable central processing unit (CPU), microcontroller, digital signal processor (DSP), Application Specific Integrated Circuit (ASIC), Field Programmable Gate Array (FPGA), etc., or any combination thereof. The control unit 109 may optionally be capable of executing software instructions stored in a computer program product e.g. in the form of a memory (not shown in FIG. 1). The memory may for example be any combination of read and write memory (RAM) and read only memory (ROM). The memory may comprise persistent storage, which for example can be a magnetic memory, an optical memory, a solid state memory or a remotely mounted memory, or any combination thereof.

The control unit 109 may be coupled to the voltage sensing unit 108, the auxiliary power supply unit 107, the resonance circuit 103, and the current interrupter unit 102, respectively, e.g. so as to at least enable communication of signals, messages, instructions and/or data between the control unit 109 and the voltage sensing unit 108, the auxiliary power supply unit 107, the resonance circuit 103, and the current interrupter unit 102, respectively (indicated by reference numerals 122, 123, 124 and 125, respectively, in FIG. 1).

The position and/or arrangement of the voltage sensing unit 108 in the current breaking arrangement 100 as shown in FIG. 1 is according to a non-limiting example. The voltage sensing unit 108 may be arranged to sense voltage of the transmission line 101, e.g. voltage between the transmission line 101 and ground, in principle at any point between the current interrupter unit 102 and the terminal 121. In alternative or in addition, the voltage sensing unit 108 can be adapted to determine voltage of (over) the capacitor 104.

In accordance with the embodiment of the present invention depicted in FIG. 1, the circuit breaking arrangement 100 may optionally comprise a circuit path which includes a resistor 116 and a diode 117 connected in series. The circuit path is connected to ground via the diode 117, as indicated in FIG. 1. The resistance of the resistor 116 may be in the range from 0Ω or substantially 0Ω and up to relatively high resistance values. As illustrated in FIG. 1, the circuit path with the resistor 116 and the diode 117 may for example be arranged between the current interrupter unit 102 and the disconnector 126. The circuit path is coupled to the resonance circuit 103. The circuit path, the inductor 105 and the capacitor 140 of the resonance circuit 103, and the auxiliary power supply unit 107 at least partially define a charging circuit path that permits charging of the capacitor 104 by means of power supplied by the auxiliary power supply unit 107. The charging circuit path may permit charging of the capacitor 104 by means of power supplied by the auxiliary power supply unit 107 even when, for example, the disconnector 126 is in an open state. The charging circuit path may in addition or in alternative permit charging of the capacitor 104 by means of power supplied by the auxiliary power supply unit 107 in case the impedance of the transmission line 101 is relatively high, such that the transmission line 101 may be unsuitable or undesired to use for conveying a charging current for charging the capacitor 104. If such functionality is desired or required, the resistor 116 may have a relatively high resistance value.

The resistor 116 and diode 117 may act as voltage limitation means which may reduce or limit the voltage over current interrupter unit 102 when direct current is flowing through the current interrupter unit 102, which in turn may enable or facilitate for the current interrupter unit 102 to have a reduced capacity to withstand relatively high voltages. In case such a voltage limitation function is desired or required, the resistor 116 may have a relatively low resistance value.

As illustrated in FIG. 1, the resonance circuit 103 can be connected to ground via the auxiliary power supply 107 such that at least some of any power transmitted in the transmission line 101 at least momentarily charges the capacitor 104 in the resonance circuit 103. Hence, the auxiliary power supply unit 107 may at least momentarily, e.g. when it is inactive and not supplying power, allow for direct current to flow between the transmission line 101 and ground via the resonance circuit 103 and the auxiliary power supply unit 107. In the following, two examples of auxiliary power supply units capable of such functionality are described with reference to FIGS. 2 and 3.

Figure 2:
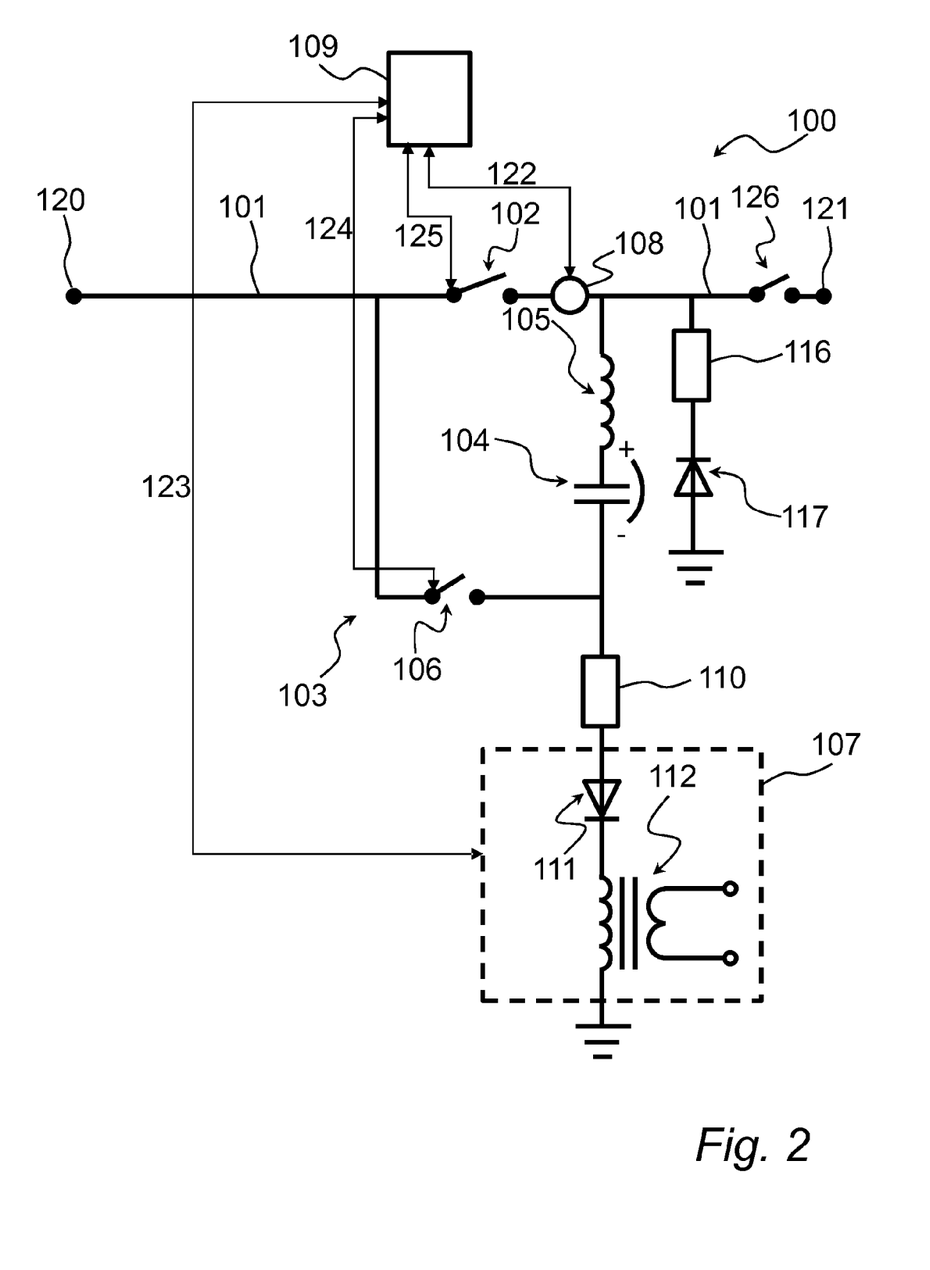

Referring now to FIG. 2, there is shown a schematic view of a circuit breaking arrangement 100 according to another embodiment of the present invention. The circuit breaking arrangement 100 depicted in FIG. 2 is similar to the circuit breaking arrangement 100 depicted in FIG. 1. The components or elements in FIGS. 1 and 2 having the same reference numerals are the same or similar, and the respective functions and/or operations thereof are the same or similar, except for that, with respect to the circuit breaking arrangement 100 depicted in FIG. 1, the auxiliary power supply unit 107 of the circuit breaking arrangement 100 depicted in FIG. 2 includes according to an example a diode 111 and a transformer 112 connected in series, as illustrated in FIG. 2. The transformer 112 is connected to ground.

Figure 3:
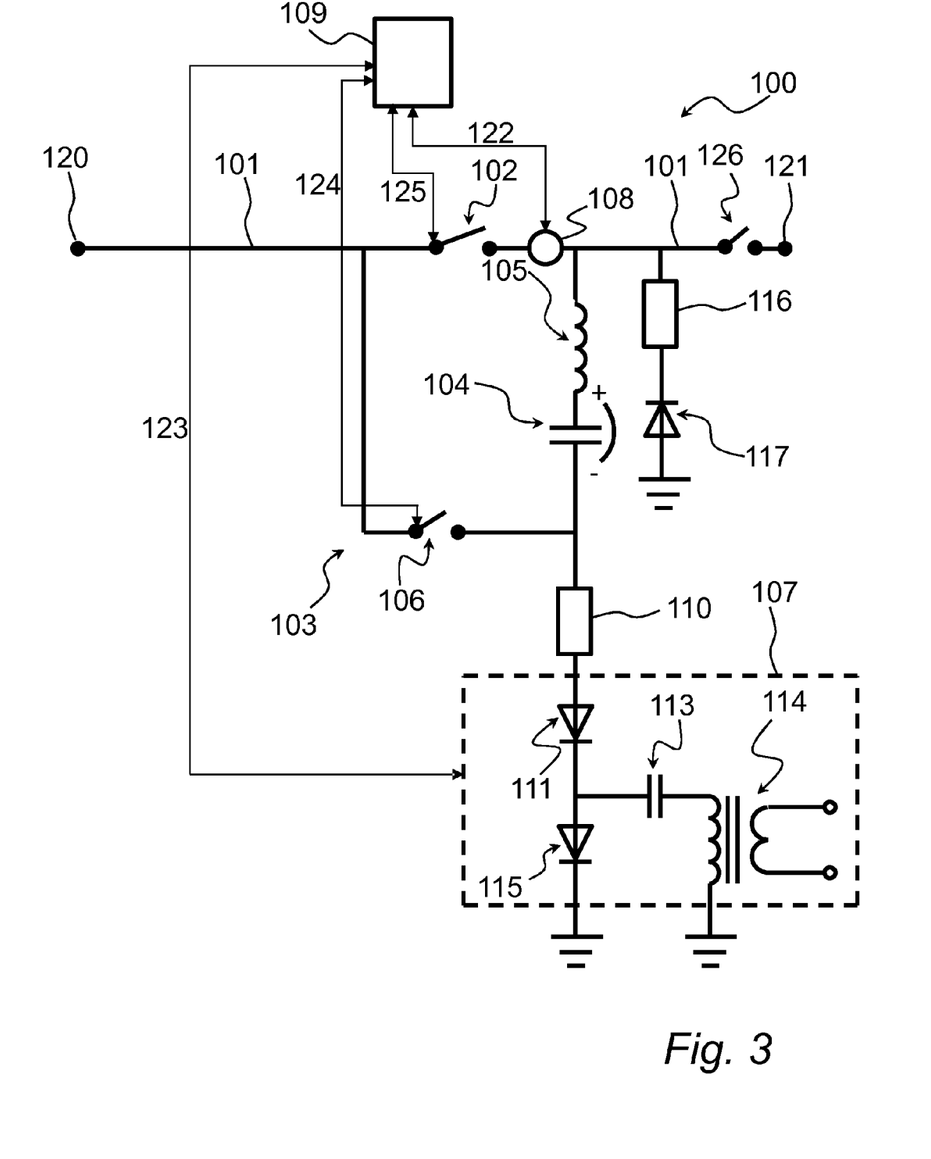

Referring now to FIG. 3, there is shown a schematic view of a circuit breaking arrangement 100 according to another embodiment of the present invention. The circuit breaking arrangement 100 depicted in FIG. 3 is similar to the circuit breaking arrangement 100 depicted in FIG. 1. The components or elements in FIGS. 1 and 3 having the same reference numerals are the same or similar, and the respective functions and/or operations thereof are the same or similar, except for that, with respect to the circuit breaking arrangement 100 depicted in FIG. 1, the auxiliary power supply unit 107 of the circuit breaking arrangement 100 depicted in FIG. 3 includes a diode 111 connected in series with another diode 115, as indicated in FIG. 3. As further indicated in FIG. 3, the auxiliary power supply unit 107 further includes a transformer 114 connected between diode 111 and diode 115 via a capacitor 113. The diode 115 and the transformer 114 are connected to ground.

Compared to the auxiliary power supply unit 107 of the circuit breaking arrangement 100 depicted in FIG. 2, the provision of the capacitor 113 and transformer 114 connected in series as illustrated in FIG. 3 may allow for using a transformer 114 of the auxiliary power supply unit 107 having a reduced capacity as compared to the transformer 112 of the auxiliary power supply unit 107 depicted in FIG. 2 (e.g. the transformer 114 having a smaller core as compared to transformer 112), while still being able to deliver the same or substantially the same voltage to the capacitor 104. This is due to that by the arrangement of the auxiliary power supply unit 107 in FIG. 3 the transformer 114 may not have to have a DC current in its secondary winding, and may only need to deliver half or about half of the voltage as compared to transformer 112 in FIG. 2, while still being able to deliver the same or substantially the same voltage to the capacitor 104.

Figure 4:
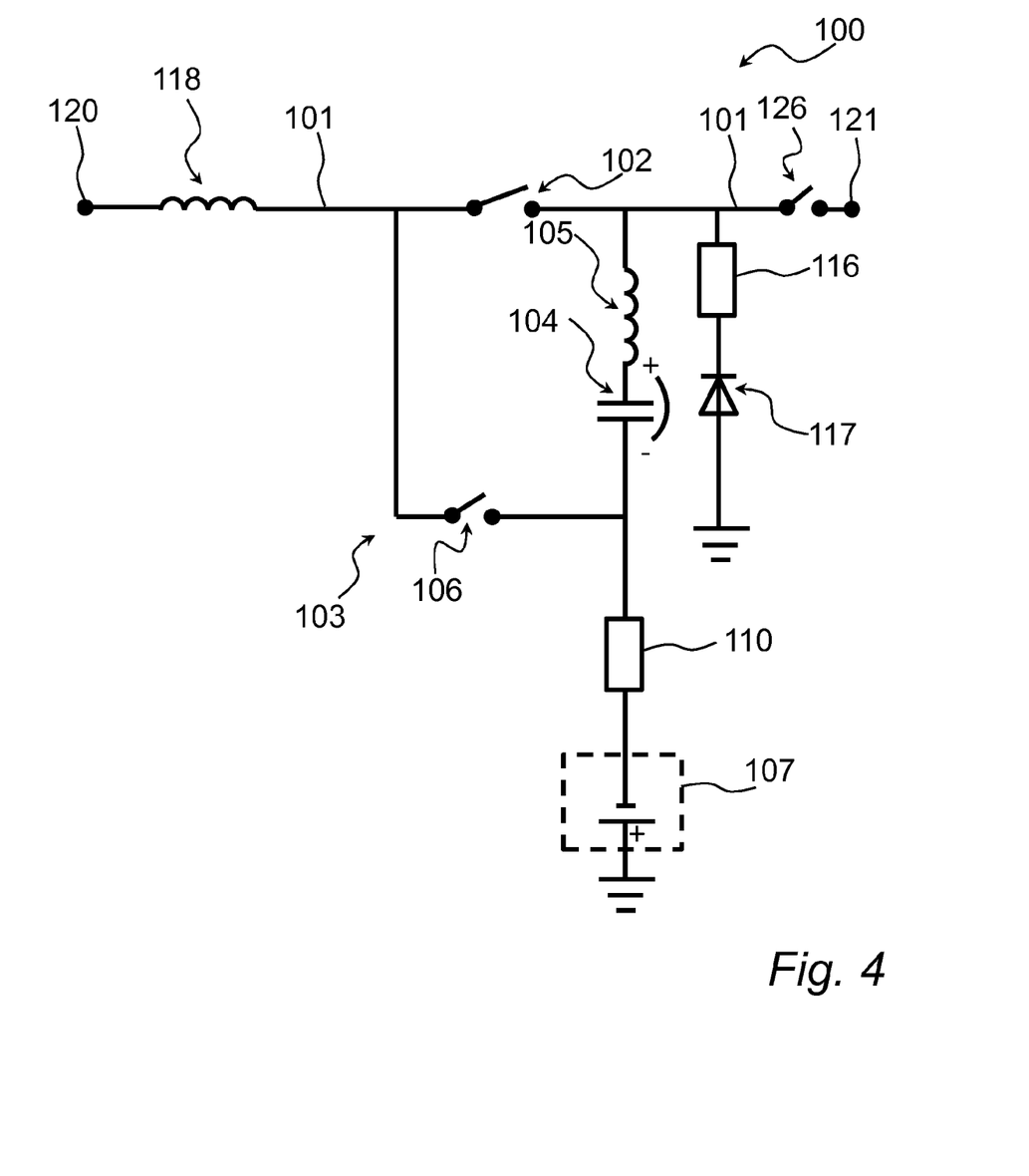

Referring now to FIG. 4, there is shown a schematic view of a circuit breaking arrangement 100 according to another embodiment of the present invention. The circuit breaking arrangement 100 depicted in FIG. 2 is similar to the circuit breaking arrangement 100 depicted in FIG. 1. However, in contrast to the circuit breaking arrangement 100 depicted in FIG. 1, the circuit breaking arrangement 100 depicted in FIG. 2 includes an inductor 120, which e.g. may be arranged between terminal 120 and current interrupter unit 102 as shown in FIG. 2. The inductor 120 may act as a current limiter to reduce a time derivative or rise time of any fault current in the transmission line 101, and in particular in the current interrupter unit 102.

Figure 5:
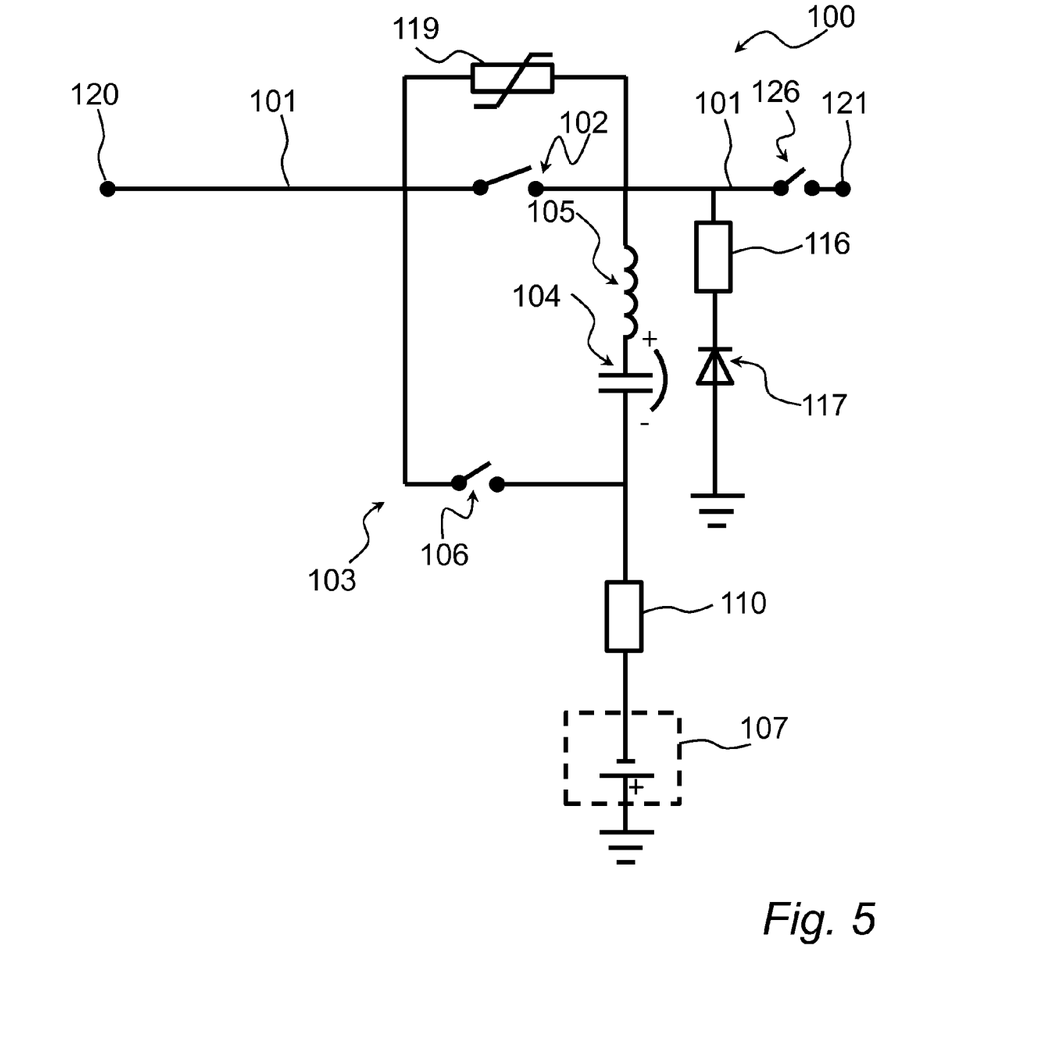

Referring now to FIG. 5, there is shown a schematic view of a circuit breaking arrangement 100 according to yet another embodiment of the present invention. The circuit breaking arrangement 100 depicted in FIG. 4 is similar to the circuit breaking arrangement 100 depicted in FIG. 1. However, in contrast to the circuit breaking arrangement 100 depicted in FIG. 1, the circuit breaking arrangement 100 depicted in FIG. 4 includes a non-linear resistor 119, which e.g. may include a surge arrester, coupled in parallel with the current interrupter unit 102. The non-linear resistor 119 may allow for using a current interrupter unit 102 having a reduced capacity to withstand relatively high voltages, by reducing or limiting the voltage over current interrupter unit 102 when direct current is flowing through the current interrupter unit 102.

It is to be understood that even though a voltage sensing unit 108 and a control unit 109 such as illustrated in FIGS. 1-3 are not explicitly shown in FIGS. 4 and 5, it is contemplated that any one of the embodiments depicted in FIGS. 4 and 5 may include a voltage sensing unit 108 and/or a control unit 109 such as illustrated in FIGS. 1-3. The operation, function and/or arrangement of any voltage sensing unit and/or a control unit included in any one of the circuit breaking arrangements depicted in FIGS. 4 and 5 may be similar to or the same as the operation, function and/or arrangement of the voltage sensing unit 108 and control unit 109 in the circuit breaking arrangement 100 depicted in any one of FIGS. 1-3.

Figure 6:
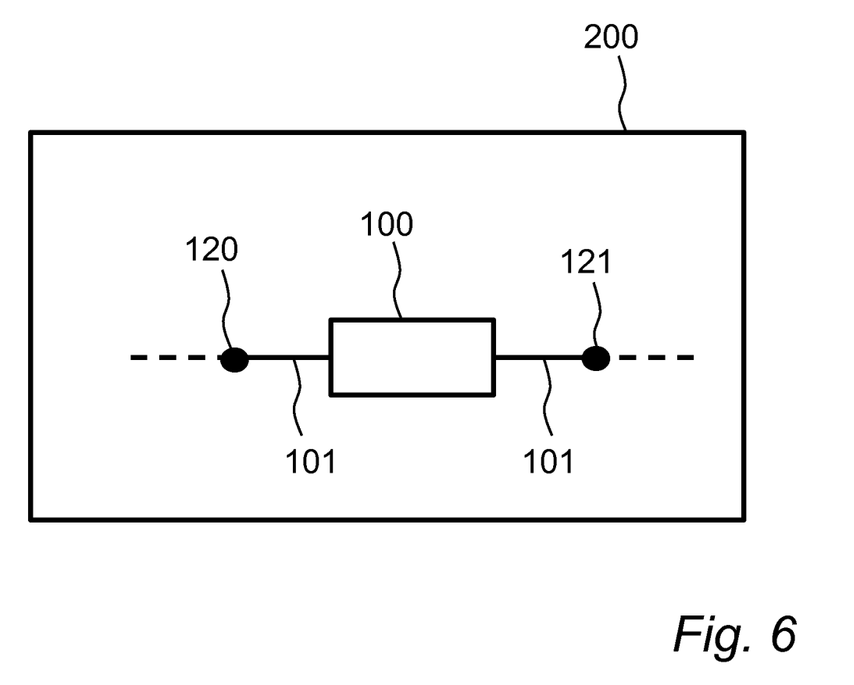
FIG. 6 is a schematic block diagram of a power system according to an embodiment of the present invention.

Referring now to FIG. 6, there is shown a schematic block diagram of a power system 200 according to an embodiment of the present invention. The power system 200 includes a circuit breaking arrangement 100 according to an embodiment of the present invention, e.g. as described above with reference to any one of FIGS. 1-5. The circuit breaking arrangement 100 is adapted to be coupled to a transmission line 101, arranged to carry direct current, for controllably effecting discontinuation of flow of direct current in the transmission line 101. In FIG. 6, a portion of transmission line 101 arranged to carry direct current between terminals 120 and 121 is shown. It is to be understood that the transmission line 101 is a part or portion of the power system 200, which e.g. may include or be constituted by a power transmission system such as an HVDC power transmission system or an HVDC grid or a DC grid. However, any other components included in the power system 200 are not shown in FIG. 6. The transmission line 101 may for example be a power transmission line such as a DC cable, an OHL or a combination of DC cable and OHL.

Figure 7:
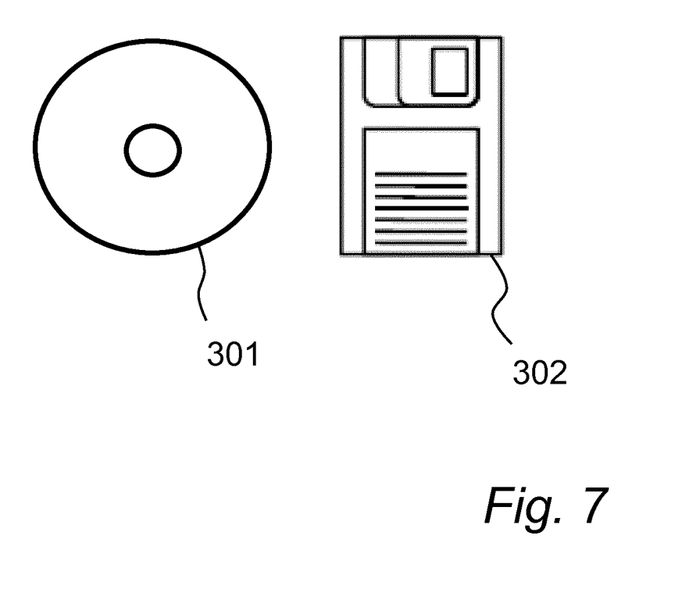
FIG. 7 is a schematic view of computer-readable means carrying computer program code according to embodiments of the present invention.

Referring now to FIG. 7, there is shown a schematic view of computer-readable means 301, 302 carrying computer program code according to embodiments of the present invention. The computer-readable means 301, 302 or computer program code is adapted to executed in a control unit 109 of a circuit breaking arrangement 100 according to an embodiment of the present invention, e.g. as described above with reference to any one of FIGS. 1-5.

With reference to any one of FIGS. 1-5, the computer-readable means 301, 302 or computer program code is configured to, when executed in the control unit 109 of the circuit breaking arrangement 100, cause the sensing unit 108 to determine voltage of the transmission line 101 and/or voltage of the capacitor 104. The computer program code is configured to, when executed in the control unit 109 of the circuit breaking arrangement 110, on a condition that the determined voltage does not comply with a selected voltage criterion, cause the auxiliary power supply unit 107 to convey power to the capacitor 104 of the resonance circuit 103, whereby the capacitor 104 is charged.

The computer-readable means 301, 302, or computer readable storage mediums, shown in FIG. 7 include a Digital Versatile Disc (DVD) 301 and a floppy disk 302. Although only two different types of computer-readable means 301, 302 are depicted in FIG. 7, the present invention encompasses embodiments employing any other suitable type of computer-readable means or computer-readable digital storage medium, such as, but not limited to, a nonvolatile memory, a hard disk drive, a CD, a Flash memory, magnetic tape, a USB memory device, a Zip drive, etc.

The control, and/or processing, unit of the circuit breaking arrangement may include or be constituted for example by any suitable CPU, microcontroller, DSP, ASIC, FPGA, etc., or any combination thereof. The control unit may optionally be capable of executing software instructions stored in a computer program product e.g. in the form of a memory. The memory may for example be any combination of RAM and ROM. The memory may comprise persistent storage, which for example can be a magnetic memory, an optical memory, a solid state memory or a remotely mounted memory, or any combination thereof.

Figure 8:
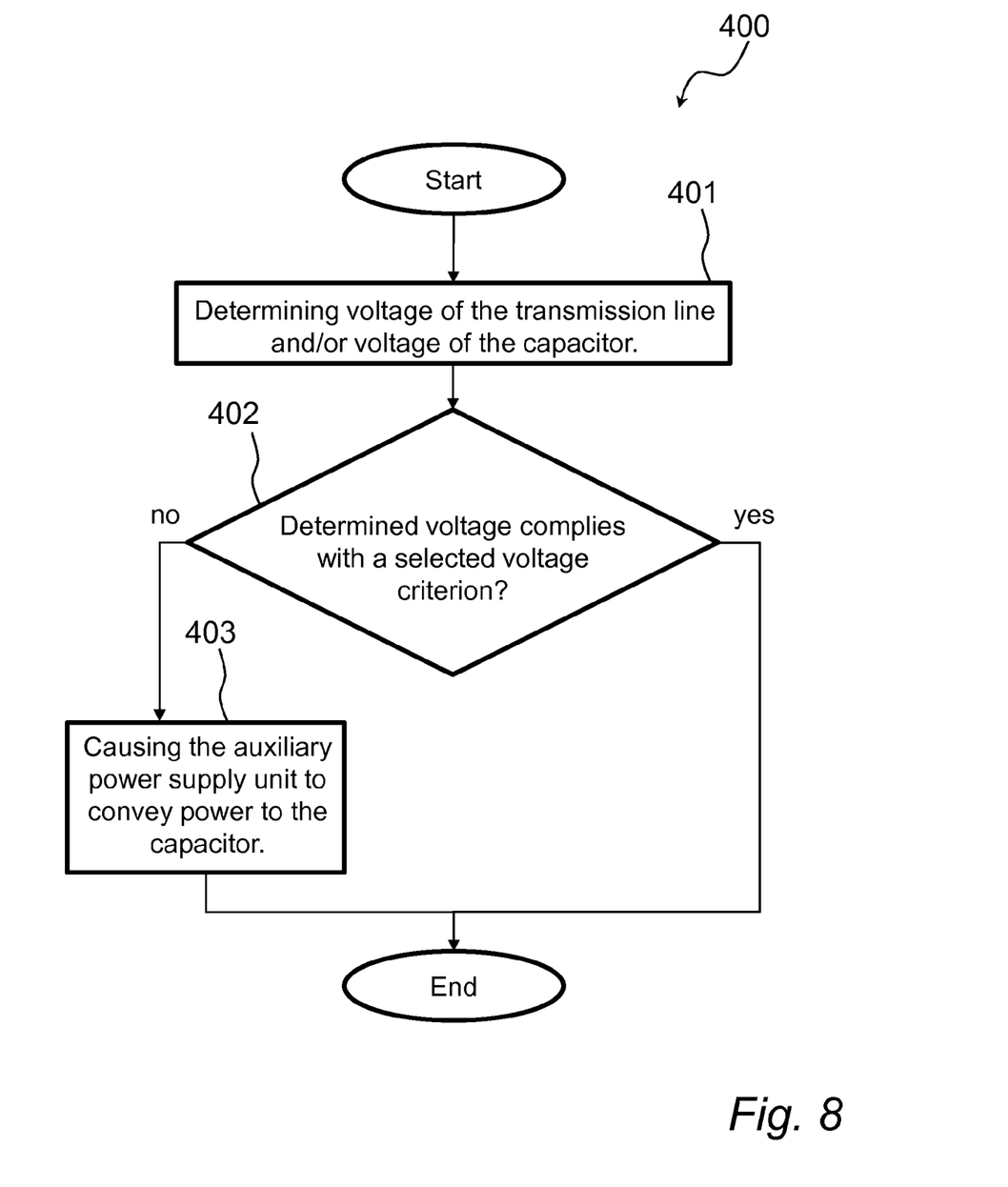
FIG. 8 is a schematic flowchart illustrating a method according to an embodiment of the present invention.

Referring now to FIG. 8, there is shown a schematic flowchart of a method 400 according to an embodiment of the present invention. The method 400 is implemented in a circuit breaking arrangement, which is adapted to be coupled to a transmission line arranged to carry direct current, for controllably effecting discontinuation of flow of direct current in the transmission line. The circuit breaking arrangement comprises a current interrupter unit adapted to, when actuated, interrupt current in the transmission line, and at least one resonance circuit connected in parallel with the current interrupter unit. The resonance circuit includes at least one capacitor, at least one inductor and a switch element. The resonance circuit is adapted to, upon actuation of the current interrupter unit, generate a resonance current superposing current of any arc generated in the current interrupter unit after actuation thereof, upon closing of the switch element by means of successive discharging and charging of the at least one capacitor. The circuit breaking arrangement comprises an auxiliary power supply unit coupled to the resonance circuit. The auxiliary power supply unit is adapted to selectively and controllably convey power to the at least one capacitor of the resonance circuit, thereby charging the at least one capacitor of the resonance circuit.

The method 400 comprises determining voltage of the transmission line and/or voltage of the at least one capacitor, S401.

At S402, there is checked whether the determined voltage complies with a selected voltage criterion.

On a condition that the determined voltage does not comply with the selected voltage criterion, the auxiliary power supply unit is caused to convey power to the at least one capacitor of the resonance circuit, S403. If the determined voltage does comply with the selected voltage criterion, the method 400 may end. In case the determined voltage complies with the selected voltage criterion, the DC line, or transmission line, voltage may be used for charging the at least one capacitor of the resonance circuit, and additional power from the auxiliary power supply unit for charging the at least one capacitor of the resonance circuit may not be required.

In conclusion, there is disclosed a circuit breaking arrangement, which is adapted to be coupled to a transmission line arranged to carry direct current for controllably effecting discontinuation of flow of direct current in the transmission line. The circuit breaking arrangement comprises a current interrupter unit adapted to, when actuated, interrupt current in the transmission line and at least one resonance circuit. The resonance circuit is connected in parallel with the current interrupter unit and includes at least one capacitor, at least one inductor and at least one switch element. The resonance circuit is adapted to, upon actuation of the current interrupter unit, generate a resonance current superposing current of any arc generated in the current interrupter unit after actuation thereof, upon closing of the switch element by means of successive discharging and charging of the at least one capacitor. An auxiliary power supply unit is coupled to the resonance circuit and adapted to selectively and controllably convey power to the at least one capacitor, thereby charging it. On a condition that voltage of the transmission line and/or voltage of the at least one capacitor does not comply with a selected voltage criterion, the auxiliary power supply unit is caused to convey power to the at least one capacitor. The circuit breaking arrangement may be arranged so as to allow for conveyance of power transmitted in the transmission line to the at least one capacitor, thereby charging it.

While the present invention has been illustrated and described in detail in the appended drawings and the foregoing description, such illustration and description are to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measures cannot be used to advantage. Any reference signs in the claims should not be construed as limiting the scope.

The invention claimed is:

1. A circuit breaking arrangement adapted to be coupled to a transmission line arranged to carry direct current for controllably effecting discontinuation of flow of direct current in the transmission line, the circuit breaking arrangement comprising:
   a current interrupter unit adapted to, when actuated, interrupt current in the transmission line;
   at least one resonance circuit connected in parallel with the current interrupter unit, the resonance circuit including at least one capacitor, at least one inductor and a switch element, wherein the resonance circuit is adapted to, upon actuation of the current interrupter unit, generate a resonance current superposing current of any arc generated in the current interrupter unit after actuation thereof, upon closing of the switch element by means of successive discharging and charging of the at least one capacitor;
   an auxiliary power supply unit coupled to the resonance circuit and adapted to selectively and controllably convey power to the at least one capacitor of the resonance circuit, thereby charging said at least one capacitor, wherein the resonance circuit is coupled to ground via the auxiliary power supply such that at least some of any power transmitted in the transmission line can at least momentarily charge the at least one capacitor of the resonance circuit;
   a sensing unit adapted to determine voltage of the transmission line and/or voltage of the at least one capacitor;
   a control unit coupled to the sensing unit and to the auxiliary power supply unit, wherein the control unit is adapted to cause the auxiliary power supply unit to convey power to the at least one capacitor of the resonance circuit in case the transmission line voltage is insufficient to sufficiently charge the at least one capacitor; and
   a circuit path coupled to the resonance circuit such that the auxiliary power supply unit, at least a part of the resonance circuit, and the circuit path at least partially define a charging circuit path, the charging circuit path being arranged so as to permit charging of the at least one capacitor in the resonance circuit by means of power supplied by the auxiliary power supply unit.

2. The circuit breaking arrangement according to claim 1, wherein the auxiliary power supply unit is arranged so as to at least momentarily allow for direct current to flow between the transmission line and ground via the resonance circuit and the auxiliary power supply unit.

3. The circuit breaking arrangement according to claim 1, wherein the circuit path comprises a resistor and a diode connected in series and with the diode connected to ground.

4. The circuit breaking arrangement according to claim 1, wherein the selected voltage criterion includes the determined voltage exceeding a predefined voltage level.

5. The circuit breaking arrangement according to claim 1, wherein the auxiliary power supply unit includes a direct current power supply.

6. The circuit breaking arrangement according to claim 1, wherein the auxiliary power supply unit includes a diode and a transformer connected in series.

7. The circuit breaking arrangement according to claim 1, wherein the auxiliary power supply unit includes at least two diodes connected in series and a transformer connected between the two diodes via a capacitor.

8. A power system comprising:
a transmission line arranged to carry direct current; and
the circuit breaking arrangement according to claim 1 coupled to the transmission line for controllably effecting discontinuation of flow of direct current in the transmission line.

9. The power system according to claim 8, further comprising a High Voltage Direct Current, HVDC, power transmission system.

10. A method implemented in a circuit breaking arrangement adapted to be coupled to a transmission line arranged to carry direct current for controllably effecting discontinuation of flow of direct current in the transmission line, the circuit breaking arrangement comprising a current interrupter unit adapted to, when actuated, interrupt current in the transmission line; at least one resonance circuit connected in parallel with the current interrupter unit, the resonance circuit including at least one capacitor, at least one inductor and a switch element, wherein the resonance circuit is adapted to, upon actuation of the current interrupter unit, generate a resonance current superposing current of any arc generated in the current interrupter unit after actuation thereof, upon closing of the switch element by means of successive discharging and charging of the at least one capacitor; an auxiliary power supply unit coupled to the resonance circuit and adapted to selectively and controllably convey power to the at least one capacitor of the resonance circuit, thereby charging said at least one capacitor, wherein the resonance circuit is coupled to ground via the auxiliary power supply such that at least some of any power transmitted in the transmission line can at least momentarily charge the at least one capacitor of the resonance circuit; and a circuit path having a resistor and a diode connected in series and with the diode connected to ground, the circuit path being coupled to the resonance circuit such that the auxiliary power supply unit, at least a part of the resonance circuit, and the circuit path at least partially define a charging circuit path, the charging circuit path being arranged so as to permit charging of the at least one capacitor in the resonance circuit by means of power supplied by the auxiliary power supply unit, the method comprising the steps of:
determining voltage of the transmission line and/or voltage of the at least one capacitor; and
causing the auxiliary power supply unit to convey power to the at least one capacitor of the resonance circuit in case the transmission line voltage is insufficient to sufficiently charge the at least one capacitor.

11. A computer program product adapted to be executed in a control unit of a circuit breaking arrangement adapted to be coupled to a transmission line arranged to carry direct current for controllably effecting discontinuation of flow of direct current in the transmission line, the circuit breaking arrangement comprising a current interrupter unit adapted to, when actuated, interrupt current in the transmission line; at least one resonance circuit connected in parallel with the current interrupter unit, the resonance circuit including at least one capacitor, at least one inductor and a switch element, wherein the resonance circuit is adapted to, upon actuation of the current interrupter unit, generate a resonance current superposing current of any arc generated in the current interrupter unit after actuation thereof, upon closing of the switch element by means of successive discharging and charging of the at least one capacitor; an auxiliary power supply unit coupled to the resonance circuit and adapted to selectively and controllably convey power to the at least one capacitor of the resonance circuit, thereby charging said at least one capacitor, wherein the resonance circuit is coupled to ground via the auxiliary power supply such that at least some of any power transmitted in the transmission line can at least momentarily charge the at least one capacitor of the resonance circuit; a sensing unit adapted to determine voltage of the transmission line and/or voltage of the at least one capacitor; and a circuit path having a resistor and a diode connected in series and with the diode connected to ground, the circuit path being coupled to the resonance circuit such that the auxiliary power supply unit, at least a part of the resonance circuit, and the circuit path at least partially define a charging circuit path, the charging circuit path being arranged so as to permit charging of the at least one capacitor in the resonance circuit by means of power supplied by the auxiliary power supply unit, the control unit being coupled to the sensing unit and to the auxiliary power supply unit, the computer program product comprising non-transitory computer-readable means carrying computer program code configured to, when executed in the control unit of the circuit breaking arrangement:
cause the sensing unit to determine voltage of the transmission line and/or voltage of the at least one capacitor; and
cause the auxiliary power supply unit to convey power to the at least one capacitor of the resonance circuit in case the transmission line voltage is insufficient to sufficiently charge the at least one capacitor.

12. The circuit breaking arrangement according to claim 2, wherein the circuit path comprises a resistor and a diode connected in series and with the diode connected to ground.

13. The circuit breaking arrangement according to claim 2, wherein the selected voltage criterion includes the determined voltage exceeding a predefined voltage level.

14. The circuit breaking arrangement according to claim 3, wherein the selected voltage criterion includes the determined voltage exceeding a predefined voltage level.

15. The circuit breaking arrangement according to claim 2, wherein the auxiliary power supply unit includes a direct current power supply.

16. The circuit breaking arrangement according to claim 3, wherein the auxiliary power supply unit includes a direct current power supply.

17. The circuit breaking arrangement according to claim 4, wherein the auxiliary power supply unit includes a direct current power supply.

18. The circuit breaking arrangement according to claim 2, wherein the auxiliary power supply unit includes a diode and a transformer connected in series.

19. The circuit breaking arrangement according to claim 3, wherein the auxiliary power supply unit includes a diode and a transformer connected in series.

20. The circuit breaking arrangement according to claim 4, wherein the auxiliary power supply unit includes a diode and a transformer connected in series.

* * * * *